INVENTORS H. INOSE
T. SAITO
BY
R. C. Winter
ATTORNEY

TIME DIVISION SWITCHING SYSTEM

Original Filed June 7, 1965 11 Sheets-Sheet 4

TIME DIVISION SWITCHING SYSTEM

Original Filed June 7, 1965

TIME DIVISION SWITCHING SYSTEM

TIME DIVISION SWITCHING SYSTEM

Original Filed June 7, 1965 11 Sheets-Sheet 8

TIME DIVISION SWITCHING SYSTEM

Original Filed June 7, 1965

May 26, 1970 HIROSHI INOSE ETAL 3,514,541

TIME DIVISION SWITCHING SYSTEM

Original Filed June 7, 1965 11 Sheets-Sheet 10

United States Patent Office 3,514,541

Patented May 26, 1970

3,514,541

TIME DIVISION SWITCHING SYSTEM

Hiroshi Inose and Tadao Saito, Tokyo, Japan, assignors to Bell Telephone Laboratories, Incorporated, New York, N.Y., a corporation of New York Original application June 7, 1965, Ser. No. 461,791, now Patent No. 3,446,917, dated May 27, 1969. Divided and this application Oct. 30, 1968, Ser. No. 793,627
The portion of the term of the patent subsequent to May 26, 1986, has been disclaimed
Int. Cl. H04j 3/16
U.S. Cl. 179—15 15 Claims

ABSTRACT OF THE DISCLOSURE

This application is directed to a time division communication system in which a switching network comprising junctor crosspoints and pulse shifting devices transposes information transmitted through the network, each crosspoint switch being connected between a pair of pulse shifters.

This is a division of copending application Ser. No. 461,791, filed June 7, 1965, now Pat. 3,446,917, issued May 27, 1969.

This invention relates to communication systems and more particularly to a telephone system operating on a time division multiplex basis.

The current practice in telephone systems is to establish a solid connection between a calling and a called line via a path which is associated individually and uninterruptedly with the connection for the duration of the call. Thus a quantity of equipment, dependent upon the number of lines served and the expected frequency of service, is provided in a common pool from which portions may be chosen and assigned to a particular call. Such a system arrangement is referred to as "space separation" in which privacy of conversation is assured by the separation of individual conversation in space.

In contrast, telephone systems have been developed which operate on a time separation basis in which a number of conversations share a single path. Privacy of conversations is assured in such systems by separation of individual conversations in time. Thus each call is assigned to the common path for an extremely short but rapidly and periodically recurring interval, and the connection between any two lines in communication is completed only during these short intervals or time slots. Samples which retain essential characteristics of the voice or other signal are transmitted in these time slots and are utilized in the called line to reconstruct the original signal. Reception of signals of any complexity through such a time division network is entirely satisfactory.

It is necessary that such a time division system identify and remember which lines have been assigned which time slots in the recurring cycle so that active lines will always be sampled at the proper time. Such operations may be synchronous in which case the same time slot is assigned to the calling and called lines. A system employing such synchronous operation is described in D. B. James et al. Pat. 2,957,949, issued Oct. 25, 1960. This type of operation is entirely satisfactory from a traffic standpoint in systems which include a single control facility common to all subscriber lines. However, a blocking problem is introduced when the system is expanded to include geographically remote groups of subscriber lines for which individual switching and control facilities are provided to concentrate the lines for connection to the central office. All of this equipment at the remote location and in the central office or control center is referred to as the concentrator; that in the remote area is known as the remote concentrator, while the associated equipment in the control center is referred to as the concentrator controller.

To illustrate this blocking problem, consider that a telephone subscriber associated with a first concentrator of a multiconcentrator system places a call to a subscriber in a second concentrator. A specific number of time slots are available in each concentrator for assignment to telephone connections in accordance with the particular traffic requirements. In a synchronous operation, as indicated, a connection is completed only when the same time slot is available in both of the concentrators concerned. Consider, for example, that the first time slot in the office cycle, designated Time Slot 1, is idle in the first concentrator. Thus it may be assigned to the calling line. However, in attempting to complete a connection through the second concentrator to the called line, it is found that Time Slot 1 in that concentrator is being utilized on another call. Thus, the instant connection is blocked from utilizing Time Slot 1 and a delay is encountered while a common idle time slot is being determined.

This problem is further aggravated as additional switching stages through which the connection must be established are added to the system. In this instance, the chances of any one time slot being idle simultaneously in the originating and terminating concentrators as well as in the intermediate switching stages are slight, and the possibility that complete blocking and loss of the call will occur is increased.

A solution to this blocking problem is provided by the arrangement described in H. Inose et al. Pat. 3,172,956, issued Mar. 9, 1965. A device is provided which delays information provided in the time slot assigned to the calling line for transmission to the called line in a different time slot. Thus, if a common time slot is not available the call is not lost, but rather, a different time slot which is idle in the concentrator terminating the called line is assigned to the called line, and information is transferred between the two time slots prior to transmission to the respective parties. Such an arrangement is termed time slot interchange, and its use in accordance with the aforementioned Inose et al. patent assures a substantial reduction in the probability that blocking will occur.

Nevertheless some blocking can be expected and, of course, in a telephone system, the loss of any calls due to the inability of the physical plant to accommodate them under traffic conditions for which the system was desgned is unacceptable.

It is a general object of this invention to provide an improved time division multiplex communication system.

It is another object of this invention to provide a time division telephone system in which the traffic handling capacity may be improved without increasing the number of available time slots. More specifically, it is an object of this invention to eliminate the blocking problem in time division switching systems so that it will always be possible to establish a connection from an idle inlet to an idle outlet regardless of the amount of traffic present in the system.

These and other objects of the invention are attained in one specific illustrative embodiment wherein a time division telephone system comprises distinct groups of telephone lines remote from one another and connected through corresponding line concentrators to a control center. The telephones associated with each concentrator are controlled on a time division multiplex basis, such that the various concentrators are each connected to the control center via a corresponding transmission channel.

When a subscriber associated with a first concentrator places a call to a subscriber associated with a second concenator, the office control equipment initially assigns an idle time slot to the calling line. It then proceeds to determine the status of that time slot in the second concentrator. If the time slot is idle in both concentrators, the office control will complete the connection in a routine manner. However, if the time slot is occupied on another call in the second concentrator and thus not available to accommodate the instant call, the office control is interrogated further in order to determine the first available time slot in the second concentrator. This is a purely random selection and bears no relationship to the time slot assigned in the originating concentrator.

Upon locating such an idle time slot in the second concentrator, the identity of both time slots is registered and transmitted to switching circuitry at appropriate times so as to complete the connection to the calling party in one time slot and to the called party in another time slot. In this fashion a transposition of time slots is accomplished, thus obviating the time slot blocking problem prevalent in systems in which the same time slot must be assigned to a call connected through a plurality of concentrators.

In accordance with the aforementioned Inose et al. patent, the switching operation necessary to accomplishment of the transposition is effected by connecting a tapped delay line to the transmission channel from each concentrator so as to receive all information incoming from active telephone lines associated with the concentrator. The taps are placed at points corresponding to the duration of each time slot in the cycle of time slots. Each tap is connected to a distinct gate, the outputs of which are connected in multiple to the transmission channels leading to each of the other concentrators. A translating device, receiving time slot designations from the office control, selectively controls the operation of these gates. Another translating device activates switches at selected cross-points to complete the talking connection in the appropriate time slots. Thus, all information received in the time slot assigned to the calling line is automatically transferred to the time slot assigned to the called line, and the connection is completed in the latter time slot. The inverse transposition is effected for information transmitted in the opposite direction.

In accordance with specific embodiments of our invention, the time slot interchange is accomplished in conjunction with the intermediate switching network, designated the junctor network, which serves to interconnect the four-wire transmission channels serving each remote concentrator via the control center. The junctor network consists of a plurality of crosspoint switches, each crosspoint providing a connection between the Send lead of the transmission channel from one remote concentrator and the Receive lead of the transmission channel to the same or another remote concentrator. Thus, each complete connection through the system involves two junctor crosspoints.

In accordance with a first embodiment, a time slot interchange device is located within the junctor network. With this arrangement, the time slot interchange device, which may comprise any suitable means for delaying information pulses for the distinct time slot intervals such as, for example, a tapped delay line or a flip-flop shift register, can assume the configuration described in the aforementioned Inose et al. patent to achieve the desired nonblocking network. The time slot interchange device or pulse shifter is arranged to transfer an information signal received from one junctor crosspoint in the particular time slot assigned to the calling line to the input of another junctor crosspoint in the time slot assigned to the called line.

In accordance with a second embodiment of the invention a pair of pulse shifters, connected to opposite sides of the junctor network, are involved in each call. One of each pair of pulse shifters is located in the Send lead of each transmission channel preceding the junctor network while the second pulse shifter in each pair is located in the Receive lead of each transmission channel succeeding the junctor network. The pulse shifter in the Send lead has one input and two outputs, while the pulse shifter in the Receive lead has two inputs and one output. Thus each received information pulse may follow a selected one of two possible paths through the junctor network.

In a third embodiment of the invention, the positioning of the pulse shifters corresponds to that of the second embodiment. However, in this instance the pulse shifter in the Send lead is arranged to transfer an information signal received in the particular one of $n$ time slots assigned to the calling line to one of $2n$ time slots available in the junctor network. If the assigned time slot is an even number, the stored pulse will be shifted to a selected one of $n$ time slots in the junctor network, while if the assigned time slot is an odd number, the stored information pulse will be shifted to a selected one of $n'$ time slots in the junctor network. Such a time slot interchange device is designated as an $n:2n$ pulse shifter. Similarly, the pulse shifter in the Receive lead is arranged to transfer an information pulse received from the junctor network in any one of the $2n$ time slots available in the junctor network to the particular time slot assigned to the called line in one of the $n$ time slots available in the concentrator terminating the called line. Such a time slot interchange device is designated a $2n:n$ pulse shifter.

Each of the foregoing arrangements provides a nonblocking network with a surprisingly few elements so that an economical nonblocking network in a time division switching system is realized.

It is a feature of this invention that time slot interchange devices be associated with a junctor network in a time division switching system in such a manner that a nonblocking system is realized.

It is a feature in accordance with a first embodiment of this invention that a time slot interchange device be located within the junctor network.

It is a feature in accordance with a second embodiment of this invention that a time slot interchange device be located on each of the input and output sides of the junctor network in each possible path through the system.

More particularly it is a feature in accordance with this embodiment of the invention that the time slot interchange device on the input side of the junctor network be arranged to receive information pulses over one path and to transfer information pulses over two paths, while the time slot interchange device on the output side of the junctor network be arranged to receive information pulses over two paths and transfer the information pulses over one path, thereby providing two distinct paths through the junctor network between each pair of time slot interchange devices.

It is a feature in accordance with a third embodiment of the invention that the time slot interchange devices again be located on each of the input and output sides of the network in each possible path through the system, that the device on the input side be arranged to receive pulses in $n$ time slots and to transfer them in $2n$ time slots, and that the device on the output side be arranged to receive pulses in $2n$ time slots and to transfer them in $n$ time slots.

A complete understanding of this invention and of these and various other features may be gained from consideration of the following detailed description and the accompanying drawings, in which.

Figure 1:
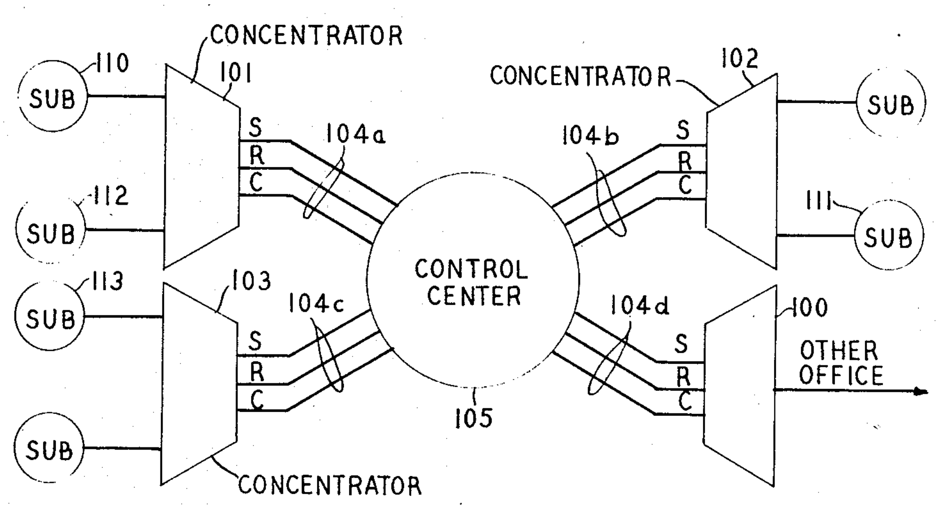
FIG. 1 is a block diagram representation of a telephone system comprising three remote telephone line concentrators and a trunk line concentrator all terminating at the control center.
Figure 2:
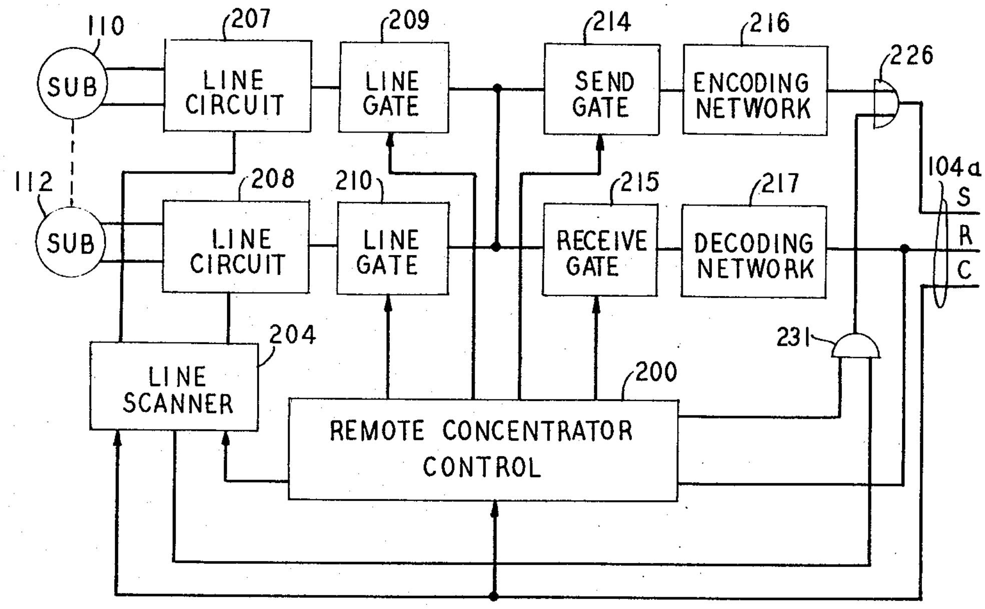
FIG. 2 is a representation in block diagram form of the concentrator switching and control portion of the telephone system in FIG. 1.
Figure 3:
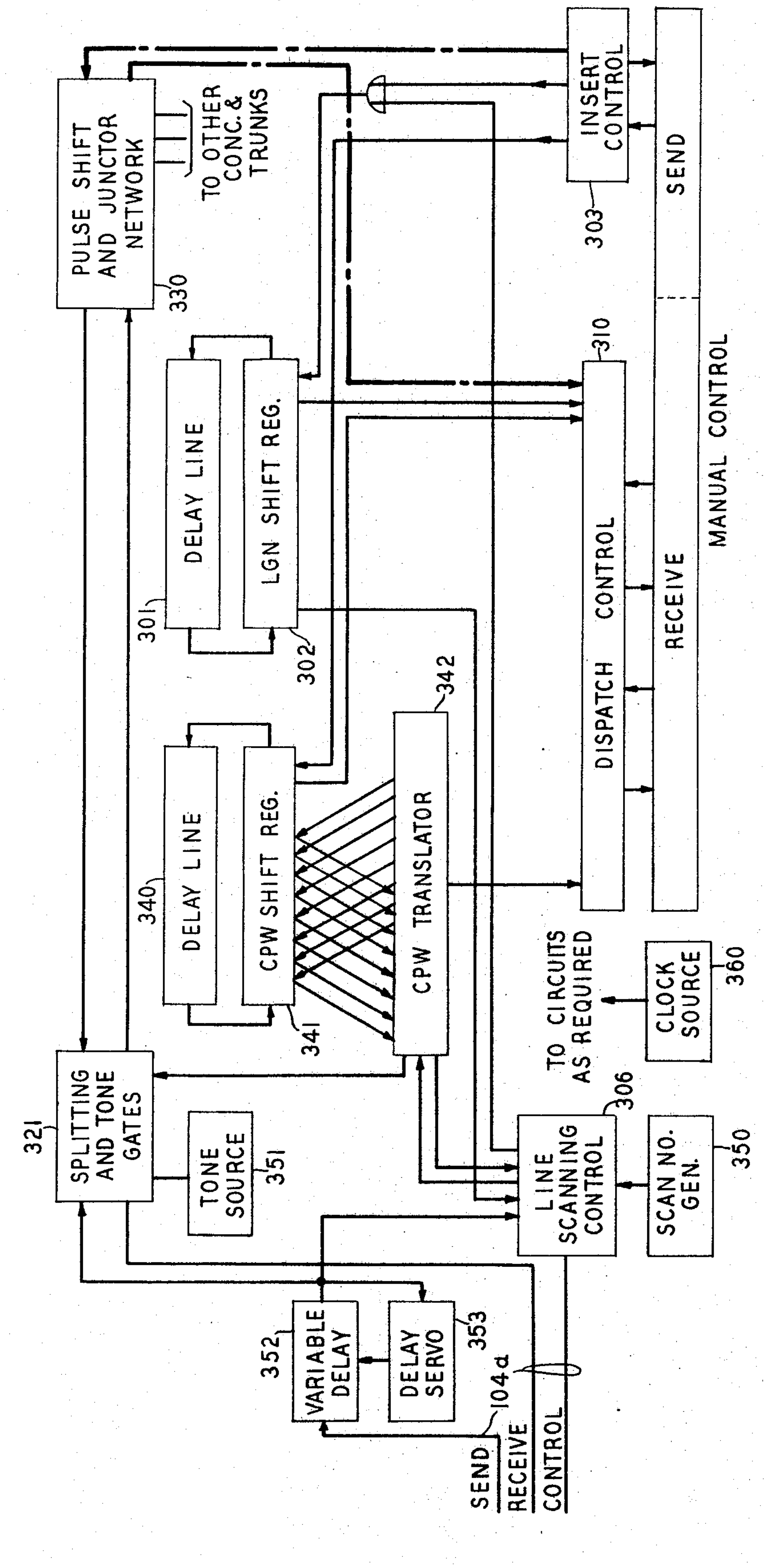
FIG. 3 is a representation in block diagram form of the control center of FIG. 1 and in which is incorporated the embodiments of the invention.

Turning now to the drawing, the time division telephone system depicted in FIGS. 1–3 is similar to the telephone system disclosed in the aforementioned James et al. patent which will be described in general terms hereinafter to provide a basis for the detailed description of the improvement realized in accordance with our invention and depicted in FIGS. 4 through 13.

In FIG. 1, the telephone office comprises the Remote Concentrators 101, 102 and 103 and the Interoffice Trunk Facilities 100, each connected via corresponding Transmission Channels 104*a*–104*d* to the Control Center 105. The remote concentrators are so named because of the connection thereto of a plurality of individual telephone subscriber lines concentrated in the same remote area. Each interconcentrator or intraconcentrator connection as well as connections between a concentrator and a foreign exchange is completed through the Control Center 105 via the appropriate Transmission Channels 104*a*–104*d* on a time division basis. The Control Center 105 assigns to a calling subscriber line a particular time slot in a recurring cycle of time slots during which time information to and from the calling and called subscriber lines is transferred over the appropriate Channels 104*a*–104*d*. Similarly, other telephone connections are assigned distinct time slots in the recurrent cycle of time slots such that the various channels are shared in time by the active telephone calls, and a considerable saving in telephone cable is the beneficial result.

Operation of the telephone office on a synchronous basis, as described in the aforementioned James et al. system, presuppose that each pair of lines in communication exchanges information in the same time slot with bilateral transmission being accorded by the appropriate transmission channels. Thus considering, for example, that Subscriber 110 connected to Concentrator 101 desires to place a call to Subscriber 111 connected to Concentrator 102, the Control Center 105 upon detection of the request for service assigns an idle time slot to Subscriber 110 and then determines the condition of that time slot in Concentrator 102. If it is idle, the connection between Subscribers 110 and 111 is completed in that time slot.

However, it is apparent that this particular time slot may also be busy on another call in Concentrator 102, such that the Control Center 105 must search through its memory to determine a common idle time slot in the two Concentrators 101 and 102. Upon determination of such a common idle time slot, idle switching connections in that time slot are located and the connected completed each time that time slot appears in the office cycle for the duration of the call.

In accordance with the instant invention, considerable improvement may be realized in such a system through a time slot transposition which completely overcomes the blocking problem encountered if the system fails to locate a common idle time slot. Thus Subscriber 110, in requesting a connection to Subscriber 111, is assigned one time slot by the Common Control 105 while Subscriber 111 is assigned a different time slot. Information then is received from Subscribed 110 over the Transmission Bus 104*a* and is transposed in the Control Center 105 to the time slot assigned to Subscriber 111 prior to its transmission over Bus 104*b*. Similarly, the information from Subscriber 111 is transposed from the time slot assigned to his line to that assigned to Subscriber 110.

The particular equipment required for this transposition will be described in general with reference to FIGS. 2 and 3, which correspond respectively to switching equipment of Concentrator 101 and that portion of the Control Center 105 serving the Concentrator 101. Duplicate equipment is provided in each remote concentrator and in the control center for each concentrator involved in the telephone office. FIGS. 2 and 3 correspond to FIGS. 2 and 3 of the above-identified James et al. patent.

Each subscriber line associated with Remote Concentrator 101, as shown in FIG. 2, is connected to the concentrator switching network via two wire talking paths. Thus Subscriber Terminal 110 is connected through a conventional Line Circuit 207 to Line Gate 209, the latter being connected in turn to Send and Receive gates 214 and 215, respectively, of the Transmission Channel 104*a*. The line gates connected to active subscriber lines are enabled in distinct selected time intervals or time slots of a repetitive cycle of time slots, and the Send and Receive gates in the common bus are enabled consecutively during each time slot. These gate operations are controlled by circuits located in the Remote Concentrator Control 200. The Remote Concentrator Control 200 in turn receives directive signals via the Receive and Control channels of the Transmission Channel 104*a*.

In order to establish a connection between two subscribers, the system first detects a request for service through a continual scanning process involving Line Scanner 204 in which the condition of each line in the remote concentrator is observed periodically in a supervisory time slot of the recurrent cycle. The subscriber off-hook condition is reported through the Line Scanner 204 to the Line Scanning Control 306 (FIG. 3) via the Send lead of the Transmission Channel 104*a* and Variable Delay 352. Upon verification of this request for service, the control center establishes in its memory a number corresponding to the calling line in a particular time slot and immediately preceding this time slot in each recurrent cycle thereafter, this number will be transmitted via the control lead of Channel 104*a* to the Remote Concentrator Control 200 which in turn translates the coded number and activates the particular line gate associated with the calling line during the selected time slot.

Concurrently with the operation of a line gate, the Send gate 214 in the Transmission Channel 104*a* is enabled so as to transfer information from the calling line through Encoding Network 216 to the Send lead of the transmission channel. Subsequently in the same time slot the Receive gate 215 is enabled while the Send gate 214 is disabled, thereby permitting transfer of information from the Receive lead of the transmission channel through Decoding Network 217 to the calling line. In this fashion bilateral transfer of information between an active line and the common transmission channel is completed in the particular time slot assigned to the active line. A more detailed description of the operation involved in the remote concentrator is contained in the aforementioned James et al. patent.

In order to further assist in an understanding of the particular timing involved in this system, it would be advisable to consider a specific system timing arrangement. Thus consider that the repetitive cycle of time slots, referred to as a "frame," consists of 24 time slots, each time slot having a duration of 5.2 microseconds. The various gates in the system are controlled by precisely timed signal pulses so as to transfer information between calling and called subscribers in the preassigned time slots. Eight binary digits or bits of information comprise a word which may be transmitted in each time slot. Thus with 24 time slots, 192 bits of information may be transferred per frame period.

Timing within a frame is established by a Common Clock Pulse Source 360, FIG. 3, serving all concentrators and all office control equipment, as described in greater detail in the aforementioned James et al. patent application. This source provides two phases of the basic pulse rate 180 degrees apart, for use throughout the central office. The source also provides pulse signals to distinct bit, word and frame conductors as required. Thus a point in time at the central office is defined by an indication of the frame, word or time slot, bit and phase. Individual frame, word, bit and phase conductors are employed in various combinations to establish the proper timing for operation of various of the control devices.

In each of the first 23 time slots of a frame, certain distinct designations must be maintained in the control equipment of FIG. 3 concerning the call being served. These designations are the Line or Trunk Gate Numbers, the Junctor Crosspoint Numbers, the Call Progress Word and the Tap Gate Numbers. The information handled in the 24th time slot concerns establishment of the call and is not assigned to any particular call. The information words are stored in distinct circulating memories, each of which includes a delay line and a short shift register, the total loop delay being equivalent to the frame interval; i.e., 24 time slots of 8 bits duration, or a total of 192 bit periods.

The circulating memory for the Line Gate Number comprises the Delay Line 301 and the Shift Register 302. Line Gate Numbers for the first 23 time slots may be inserted in this memory loop under the control of the Insert Control 303. Line Gate Numbers may also be inserted in the Line Gate Number Shift Register 302 by the Line Scanning Control 306. Line Gate Numbers are read out of the Shift Register 302 and transmitted to the remote concentrator over the Control lead of the Transmission Channel **104*a* through the Line Scanning Control 306. This Line Gate Number Information is utilized by control equipment in the remote concentrator to enable the particular line gate corresponding to the Line Gate Number so as to connect the associated line to the transmission channel for transfer of information during the assigned time slot. This Line Gate Number is also transmitted to the Dispatch Control 310** where it is available to the Receive portion of the Manual Control.

Figure 4:
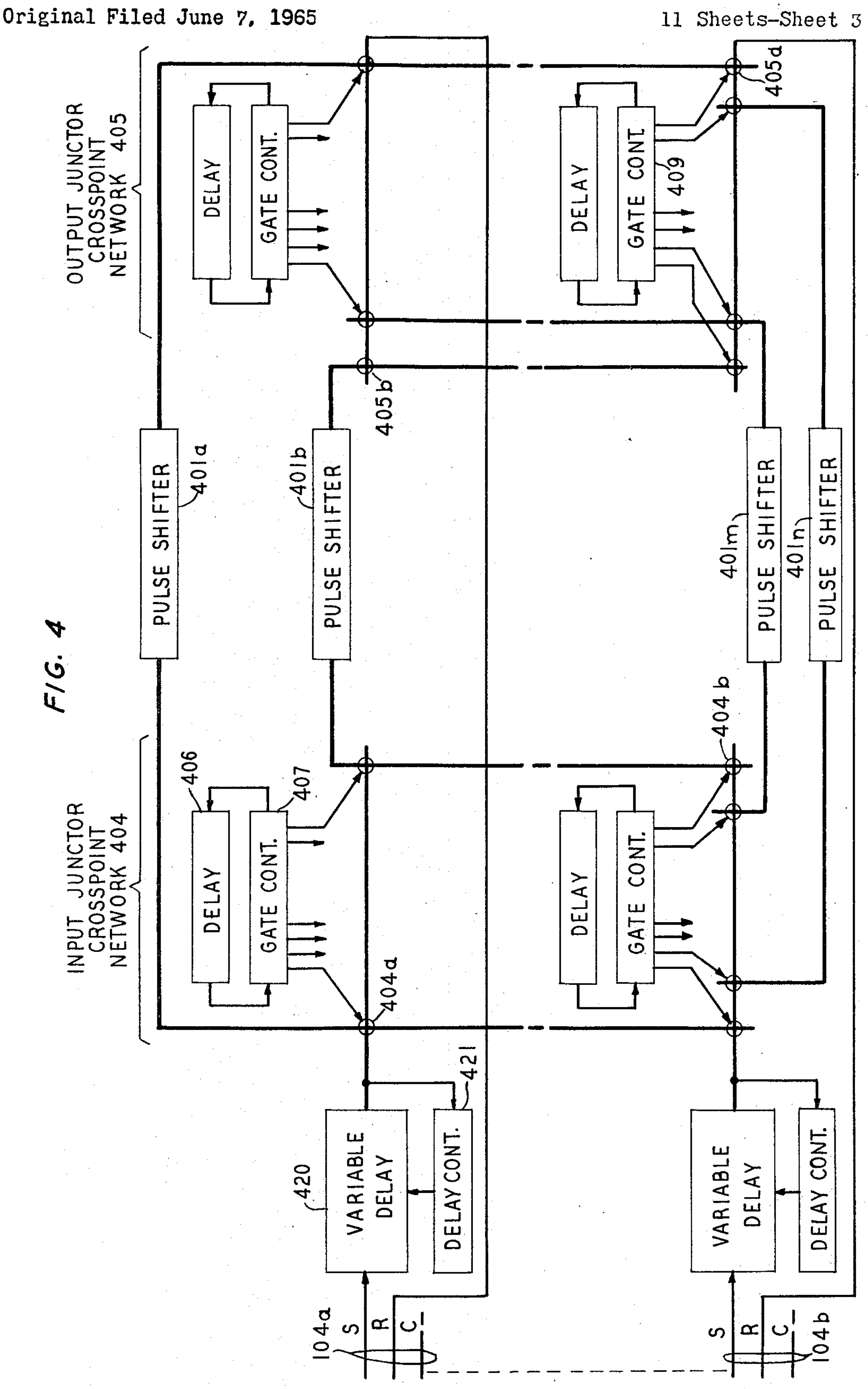
FIG. 4 is a representation in block diagram form of the components in the system particularly concerned in a first illustrative embodiment of our invention for time slot interchange in the control center of FIG. 3.
Figure 6:
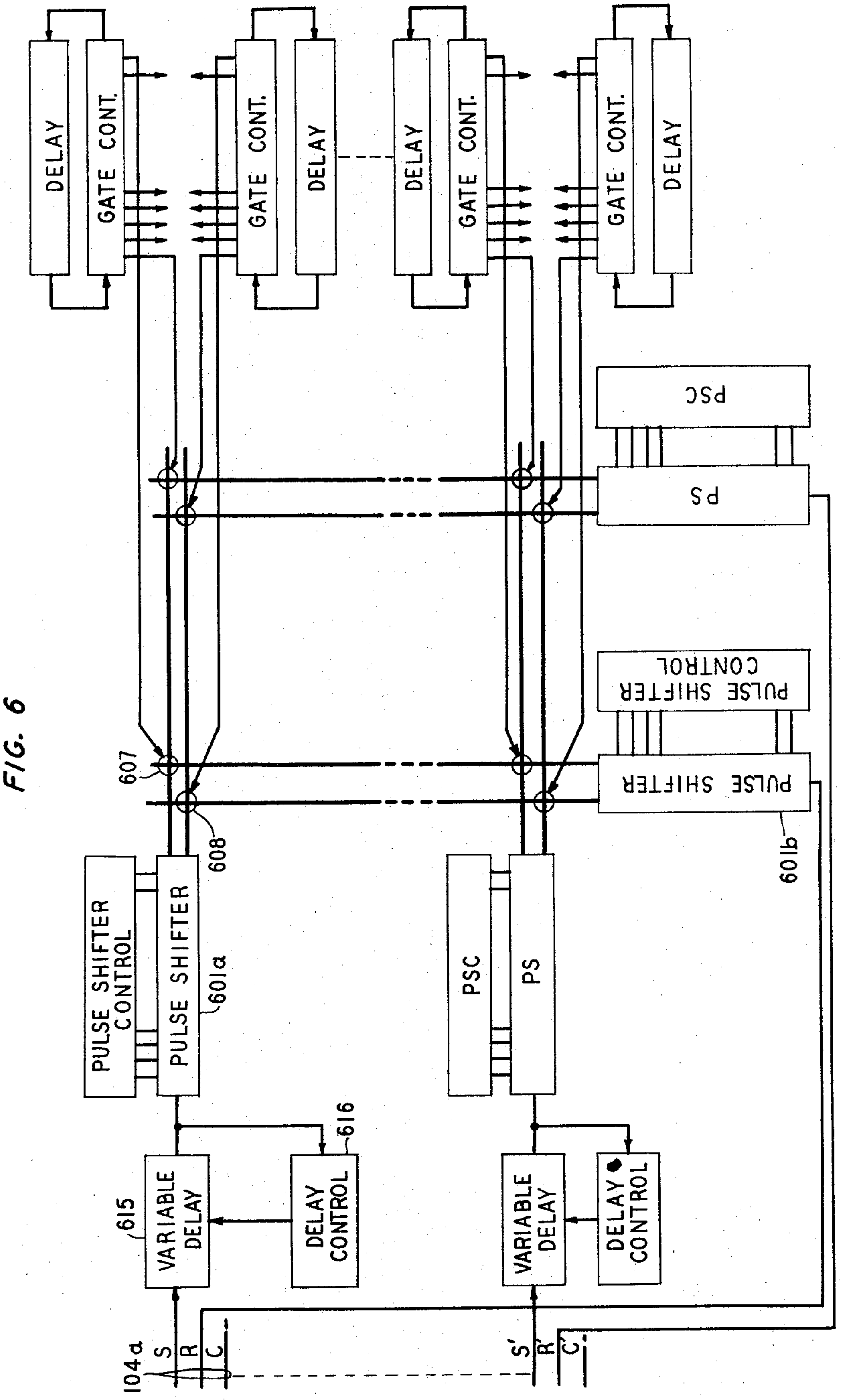
FIG. 6 is a representation in block diagram form of a portion of the control center in FIG. 1 in which is incorporated a second embodiment of our invention.
Figure 9:
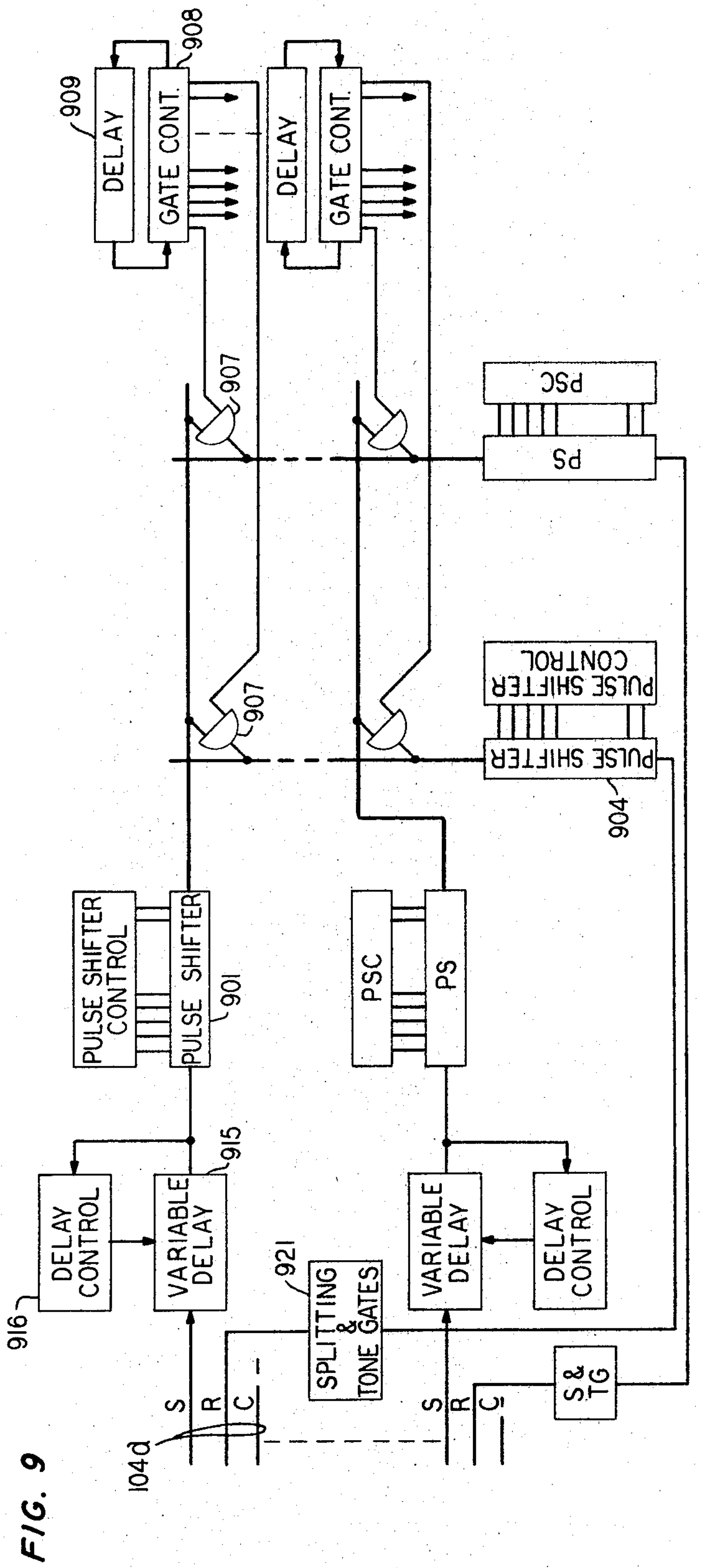
FIG. 9 is a representation in block diagram form of a portion of the control equipment of the control center in FIG. 1 in which is incorporated a third embodiment of our invention.

The Control Center further comprises a switching network designated the Pulse Shift and Junctor Network 330. A connection between calling and called subscribers is completed by operation of appropriate crosspoint switches or gates in this network, designated junctor crosspoints, for each direction of transmission. As will be apparent from the description of FIGS. 4, 6 and 9 hereinafter, a pair of junctor crosspoints in Network 330 is operated to complete the connection for transmission of information from a calling subscriber in one concentrator to a called subscriber in the same or another concentrator. Another junctor crosspoint pair is operated to complete a transmission path from the called party to the calling party. The connections are also completed in both directions through time slot interchange devices or pulse shifters located in Network 330 in accordance with the specific embodiments of the invention as illustrated in FIGS. 4, 6 and 9. Control of the pulse shifters and junctor crosspoints is exercised by Tap Gate Numbers and Junctor Crosspoint Numbers, respectively, contained in circulating memories to be described hereinafter, which memories receive orders from the Insert Control 303 and transmit information to the Dispatch Control 310.

It is apparent that the myriad of switching operations taking place in this system in precisely timed intervals requires that the progress in the establishment and maintenance of a call be followed by additional control equipment. The Call Progress Word is the designation accorded the current status of a call for the benefit of all other elements in the common control. Call Progress Words are stored in a final circulating memory comprising Delay Line 340 and Call Progress Word Shift Register 341. At selected intervals the current Call Progress Word relating to a particular call is utilized to control various other switching and control elements. Upon the change in the status of a call, a new Call Progress Word will replace that recorded in the circulating memory relating to a particular call. A more complete description of the composition and operation of corresponding circulating memories and translators may be found in the aforementioned James et al. patent.

In summary, four information words; viz, Line Gate Number, Junctor Crosspoint Number, Tap Gate Number and Call Progress Word, are circulated in individual memories. The Line Gate Numbers control the operation of the individual line gates at the remote concentrators to effect connection of the subscriber lines to the common transmission bus. The Junctor Crosspoint Numbers are transmitted at the appropriate times to effect control of the junctor crosspoints in accordance with the desired transmission channel interconnections the Tap Gate Numbers are translated at the appropriate times to operate tap gates connected to various pulse shifters in the Network 330 so as to implement the time slot interchange directly concerned with the instant invention. The Call Progress Word reflects the state of each call to the various control components.

Other components indicated in FIG. 3 are described only in brief hereinafter inasmuch as they are not directly concerned in the operation of the system with respect to the instant invention and are completely described in the aforementioned James et al. patent. The Line Scanning Control 306 and the Scan Number Generator 350, in conjunction with other control equipment in the common control, serve to observe the condition of each subscriber line connected to the Remote Concentrator 101 and to detect and record in the 24th time slot an indication of the condition of each of the subscriber lines as they are scanned in sequence. The system transmits information over the transmission channels and through the common control in pulse code form and the Splitting and Tone Gate Circuit 321 provides means for sending coded supervisory tones from the Tone Source 351 to remote concentrator without having to engage link crosspoints or tap gates; Tone Source 351 may be of the type disclosed in H. E. Vaughan Pat. 3,050,589, issued Aug. 21, 1962.

It is apparent that a variable time delay results during transmission of the signal from the remote concentrator to the common control. In order to compensate for this transmission delay, the Variable Delay 352 and the Delay Servo 353 serve to adjust the length of delay to be exactly one frame interval, such that the common control receives the information in the same time slot in which it was transmitted from the remote concentrator except that it is one frame interval later; the Delay Servo 353 may be of the type shown in W. A. Malthaner Pat. 2,960,571, issued Nov. 15, 1960.

In accordance with one specific embodiment of our invention, as depicted in FIG. 4, a plurality of time slot interchange devices or Pulse Shifters **401*a*–401*n* are included in the Pulse Shift and Junctor Network 330 between the Send and Receive leads of the Transmission Channels such as 104***a* and 104*b*. To simplify the figure, pulse shift and junctor network elements sufficient to serve only two concentrators are disclosed, although it will be recognized that the quantity of elements in Network 330 is proportional to the number of concentrators served by the Control Center 105. A completely nonblocking network is realized with this arrangement by the provision of $2r-1$ pulse shifters, each having $n$ output taps, where $r$ is the number of concentrators in the system and n is the number of time slots available to each concentrator.

Figure 5:
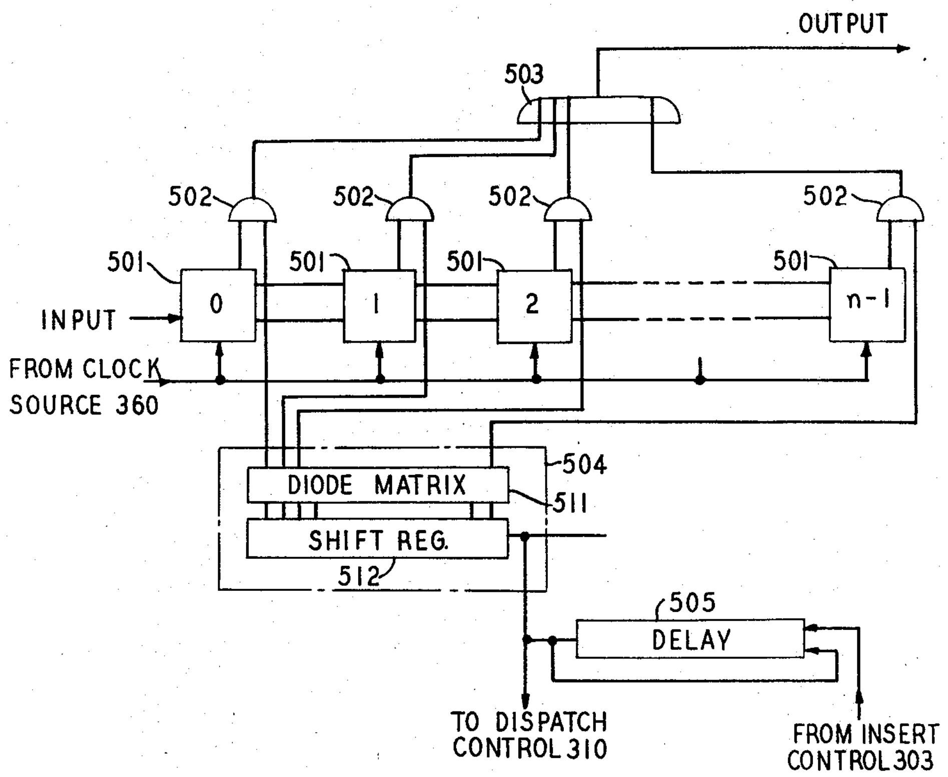
FIG. 5 is a representation in greater detail of specific circuit components depicted in FIG. 4.
Figure 11:
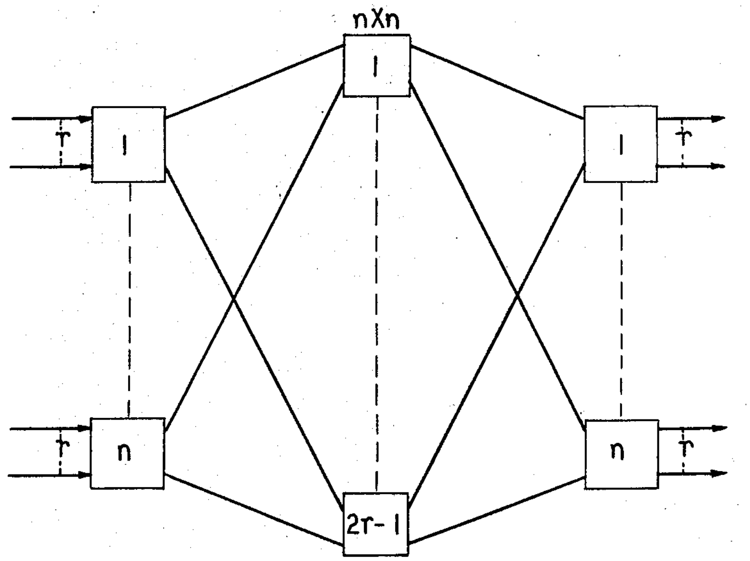
FIGS. 11, 12, and 13 are block diagrams of a three stage space division switching network which is essentially nonblocking and corresponds to the networks disclosed in the third embodiment of our invention.

FIG. 5 illustrates the particular form of pulse shifter and control utilized in the specific embodiment of the invention depicted in FIG. 4. The pulse shifter itself has a single input and a single output and comprises a plurality of Flip-flop Registers 501, AND Gates 502 and an OR Gate 503. In the arrangement illustrated the Registers 501 are serially connected in stages 0 through $n-1$ to form a shift register, although other apparatus, such as a tapped delay line, would serve the same purpose. The stages are controlled so as to provide a single time slot delay between application of each shift pulse by Clock 360. Input information is applied to the first stage and shifted through successive stages in conjunction with the clock signals. Output information is taken from each stage through AND Gates 502, designated tap gates, in conjunction with control signals from Pulse Shifter Control 504. The Pulse Shifter Control 504 consists of a Shift Register 512 and Translator 511, the Control 504 in turn being served by Delay 505, advantageously comprising a circulating delay line. The Delay 505, in turn, receives control information in the form of tap gate designations from Insert Control 303, FIG. 3. The designations stored in Delay 505 are thus presented in sequence to Shift Register 512, the output of which is translated in the Tap Gate Number Translator 511 and applied to the designated Tap Gate 502 in a given time slot. The Tap Gate Numbers also are transmitted for control purposes from the memory loop to the Dispatch Control 310, FIG. 3. Considering 24 time slots in the recurrent office cycle, there may be 24 Tap Gates 502 and a corresponding number of Stages 501 in the Pulse Shifter. The outputs of the Tap Gates 502 are connected via OR Gate 503 to the single output.

Again considering FIG. 4, each pulse shifter is accessible from the Send lead of each Transmission Channel such as 104*a* and 104*b*, through a column of crosspoints in Input Junctor Crosspoint Network 404. Similarly, the Receive lead of each Transmission Channel is accessible from each pulse shifter through a column of crosspoints in Output Junctor Crosspoint Network 405. Control of the junctor crosspoints in each row of the respective input and output networks is effected by corresponding circulating memory elements, the outputs of which are applied to the particular desired junctor crosspoints at the appropriate time. Thus, for example, Delay 406 and Gate Control 407 selectively enable a row of crosspoints, including Crosspoint 404*a*, in the Input Junctor Crosspoint Network 404. As in the case of the Tap Gate Numbers, the numbers circulated through the junctor crosspoint circulating memory are provided by the Insert Control 303, FIG. 3. Also the Junctor Crosspoint Numbers stored in the circulating memory are available to the Receive portion of the Manual Control via the Dispatch Control 310.

The time slot interchange operation, in accordance with the embodiment disclosed in FIG. 4, may be readily understood from consideration of the following description of the connection of a pair of lines in communication through the telephone office. Thus consider, for example, that Subscriber 110 in Concentrator 101 desires to communicate with Subscriber 111 in Concentrator 102 (FIG. 1). The connection is established in the manner disclosed in the aforementioned James et al. patent to the point of assigning an idle time slot to the calling Subscriber 110 and determining the concentrator to which the called Subscriber 111 is connected.

In the case of the James et al. system, the office control equipment then proceeds to locate a common idle time slot in the concentrators associated with the respective calling and called lines, with preference being accorded to the time slot originally assigned to the calling line. It is apparent, however, that the time slot assigned to Subscriber 110, which was of course previously idle in Concentrator 101, may be occupied in Concentrator 102 on an intraconcentrator call or on an interconcentrator call involving a concentrator other than 101. In this instance the office control equipment proceeds to determine the availability of succeeding time slots in both Concentrators 101 and 102 until a common idle time slot is found.

In contrast to this arrangement, our invention removes the attendant delay by obviating the need to determine a common idle time slot. Thus upon determination of the time slot assigned to the calling Subscriber 110, the office control equipment immediately interrogates the control equipment associated with Concentrator 102 to determine which time slots are idle therein. If the time slot assigned to the calling Subscriber 110 is not idle in Concentrator 102, successive time slots are investigated and the first available idle time slot in Concentrator 102 is assigned to the called Subscriber 111. Thereupon, the time slot assignments are registered in the Dispatch Control 310 (FIG. 3) and are available to the Manual Control for assignment to the various circulating memories as required.

The Line Gate Numbers corresponding to the calling and called lines are stored in the Line Gate Number shift registers for the respective concentrators in the assigned time slot. For example, consider that Time Slot 2 is assigned to the calling Subscriber 110 and Time Slot 6 is assigned to the called Subscriber 111. The appropriate Line Gate Number for operation of the line gate associated with Subscriber 110 is thereupon stored in the LGN Shift Register 302 (FIG. 3) via the Insert Control 303 so as to be transmitted to the Remote Concentrator 101 for appropriate operation of the line gate at each cyclic appearance of the assigned Time Slot 2. Similarly, a Line Gate Number is stored in the LGN shift register associated with Remote Concentrator 102 in Time Slot 6 for operation of the line gate associated with Subscriber 111.

Information from Subscriber 110 thereupon arrives at an input to the Pulse Shift and Junctor Network 330 in Time Slot 2 and is transmitted from Network 330 to the called Subscriber 111 in Time Slot 6 assigned to his line. Similarly, information from Subscriber 111 will arrive at an input to the Network 330 in Time Slot 6 and must be delayed therein for a sufficient period to permit its transmission in Time Slot 2 of the subsequent cycle of time slots to Subscriber 110. Considering $n$ equals 24 time slots in the recurrent cycle, the foregoing transposition is accomplished by storing two tap gate designations $TG_1$ and $TG_2$ in the common control, $TG_1$ representing the absolute difference between the two assigned time slots and $TG_2$ representing 24 minus $TG_1$. The stored designations thus may be stated as follows:

$$TG_1=|TS_1-TS_2|$$

$$TG_2=|TS_1-TS_2| \qquad (1)$$

As depicted in FIG. 4, the Tap Gate Designation $TG_1$ is transmitted from Insert Control 303 to a selected one of the Pulse Shifters 401*a*–401*n*, the selection being based upon the availability of the pulse shifter in the time slots assigned to both the calling and called lines. Let us assume in this example that $TG_1$ is transmitted to Pulse Shifter 401*a* which was found to be idle in Time Slots 2 and 6. In this instance $$TG_1=|TS_1-TS_2|=|2-6|=4 \qquad (2)$$

so that the coded designation stored in the corresponding Pulse Shifter Control 504, FIG. 5, will serve to operate the Tap Gate 502 connected to the output of the fourth Stage 501 in Time Slot 6.

Concurrently the Insert Control 303 transmits a coded designation of the appropriate Input Junctor Crosspoint; i.e., 404*a*, to be operated in Time Slot 2, to the corresponding Junctor Gate Control 407 and also transmits a coded designation of the approprate Output Junctor Crosspoint 405*a* to the corresponding Junctor Gate Control 409 in Time Slot 6. Thus in Time Slot 2 Junctor Crosspoint 404*a* will be enabled to transmit information from the calling Subscriber 110 on the Send lead of Transmission Channel 104*a* to the input of Pulse Shifter 401*a*. Information received in Time Slot 2 at Pulse Shifter 401*a* is delayed for four time slot intervals by action of its Pulse Shifter Control 504 and is then transmitted through Output Junctor Crosspoint 405*a* in Time Slot 6 to the Receive lead of Transmission Channel 104*b* and from thence to the called Subscriber 111.

Corresponding operations occur in the control circuits directing the operation of Concentrator 102. Thus another one of the pulse shifters available in Time Slots 6 and 2; e.g., 401*b*, is assigned to the called party and is operated so as to transpose information received therein in Time Slot 6 to Time Slot 2. This is accomplished by the insertion of $TG_2$, which equals 20 in this instance $$(TG_2=n-TG_1=24-4=20) \qquad (3)$$

in its Pulse Shifter Control 504, and the consequent operation of the 20th Tap Gate 502 during Time Slot 2. Similarly, the appropriate Input Junctor Crosspoint 404*b*, connected to the Send lead of Transmission Channel 104*b*, is operated in Time Slot 6 so as to transmit the information in that time slot to the assigned Pulse Shifter 401*b*, the output of which is transmitted in Time Slot 2 through the appropriate Output Junctor Crosspoint 405*b* to the Receive lead of Transmission Channel 104*a* and thence to the Subscriber 110.

The generation of the appropriate junctor crosspoint designations as well as $TG_1$ and $TG_2$ and their transmission to the appropriate control circuits in Network 330 is readily accomplished by logic equipment available in Control Center 105, as described in the aforementioned James et al. patent. As indicated, the network depicted in FIG. 4 is completely nonblocking. It is equivalent to the three stage space division switching network illustrated in FIG. 11.

FIG. 6 illustrates another specific embodiment of our invention included in the Pulse Shift and Junctor Network 330. In this instance the pulse shifters are connected on the input and output sides of the junctor network. Thus a specific pulse shifter is associated with the Send lead of each transmission channel and another distinct pulse shifter is associated with the Receive lead of each transmission channel; e.g., Pulse Shifter 601*a* is connected through Variable Delay 615 to the Send lead of Transmission Channel 104*a*, while the Receive lead of that channel is connected to Pulse Shifter 601*b*. Each pulse shifter in the Send lead, such as 601*a*, has one input and two outputs, while each pulse shifter in the Receive lead, such as 604*b*, has two inputs and one output. Thus a connection completed in one direction between a calling and called party involves two pulse shifters in the Network 330, which pair of pulse shifters in turn has a choice of two transmission paths through the junctor network.

Figure 7:
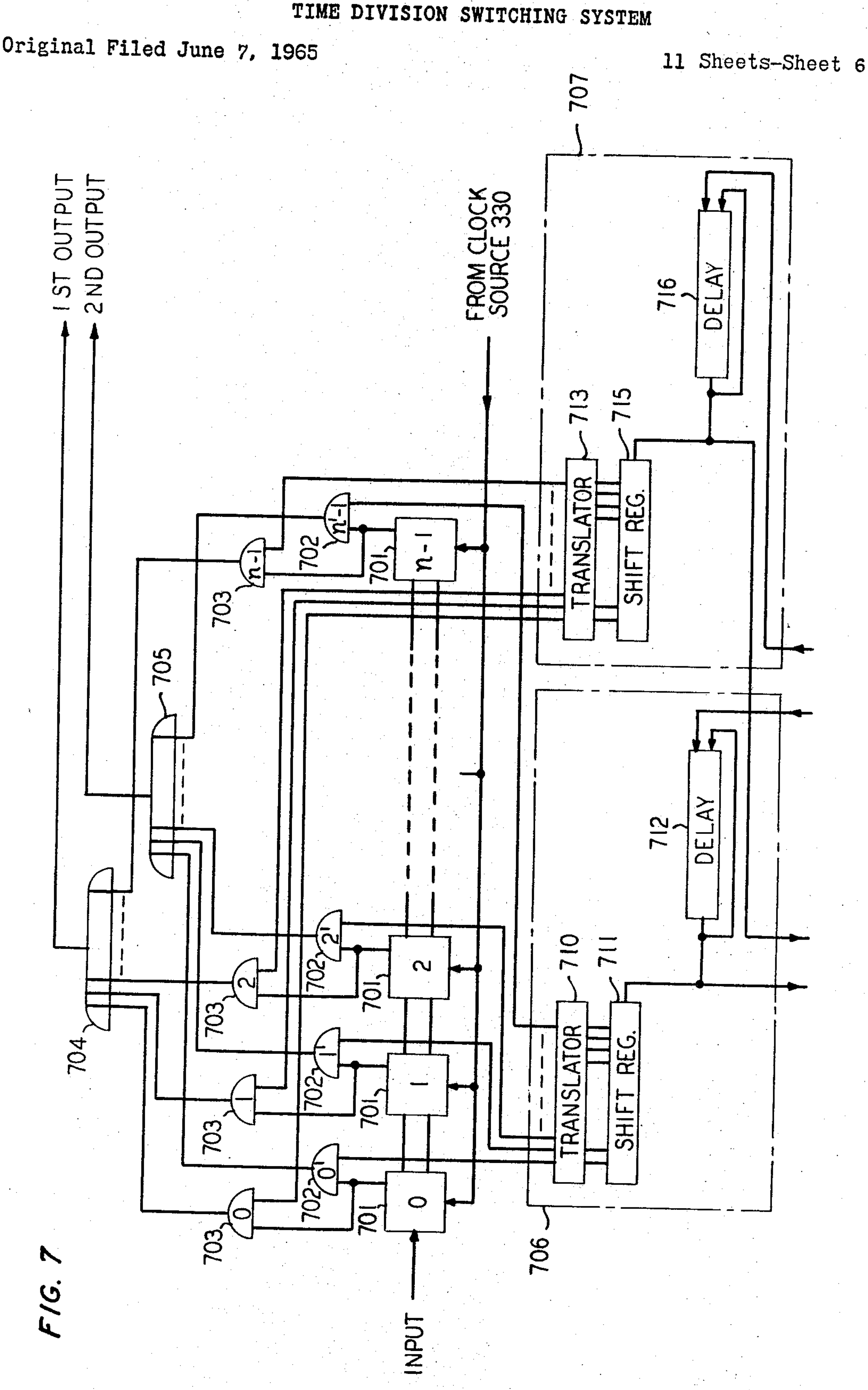
FIGS. 7 and 8A are representations in greater detail of specific components in the Send and Receive leads, respectively, of the transmission links terminating in the control center.

FIG. 7 depicts the Send lead pulse shifter and related control circuitry. A shift register having stages 0 through $n$–1 with the input applied to the first stage, the clock pulse being applied to each stage and an output being taken from each stage, corresponds to the pulse shifter described hereinbefore with respect to FIG. 5. In this instance, each output is applied to a pair of AND Gates 702 and 703 which are enabled respectively by Control Circuits 706 and 707, each comprising a Circulating Delay Line 712, 716, Shift Register 711, 715, and Translator 710, 713 operating in the manner described with respect to FIG. 5. Thus, dependent upon the information stored in Control Circuits 706 and 707, the first or second outputs are selected for the output of any stage in the pulse shifter through the corresponding AND Gates 702 and 703 and the final OR Gates 704 and 705.

Figure 8A:
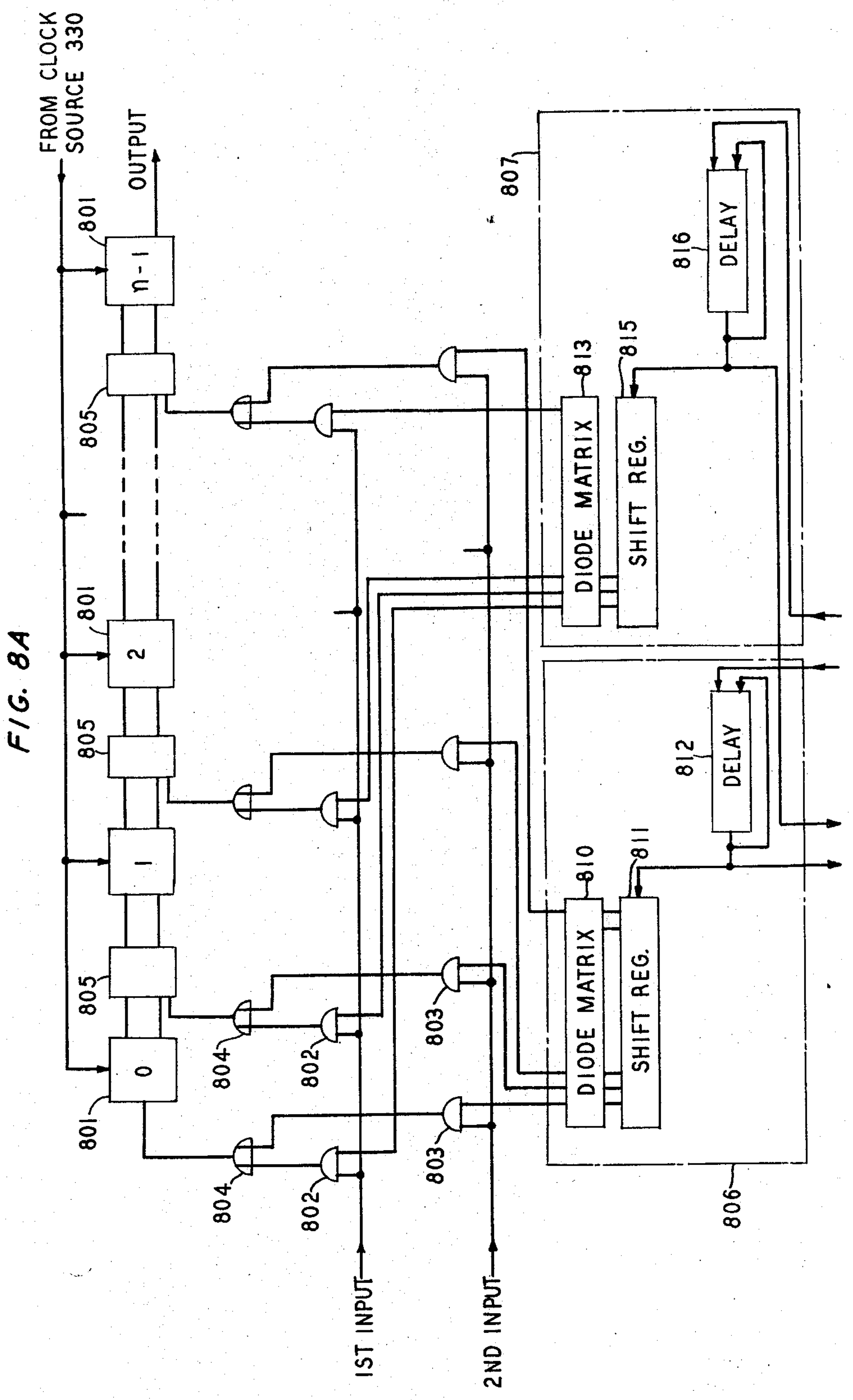
Figure 8B:
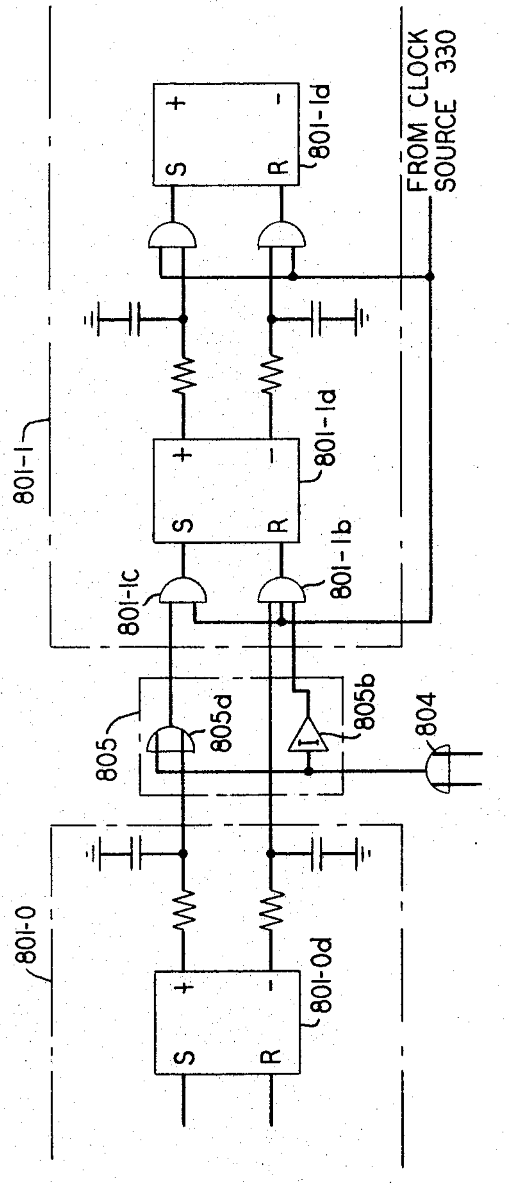
FIG. 8B is a schematic representation of a portion of the circuit depicted in FIGS. 8A and 10.

The pulse shifter depicted in FIG. 8*a* is similar to that shown in FIG. 7 but in this instance two inputs and a single output are provided. The respective Control Circuits 806 and 807 selectively enable the input AND Gates 802 and 803 to apply input information in a particular time slot to a selected stage 0 through $n$–1 through OR Gates 804. The output is then taken from the final stage $n$–1 of the pulse shifter.

One distinction of this pulse shifter arrangement over that depicted in FIG. 7 is the presence of Logic Circuitry 805 intermediate adjacent stages of the pulse shifter which permits the introduction of input information at any stage. This network is depicted in greater detail in FIG. 8B. As seen therein, Network 805 comprises OR Gate 805*a* and Inverter 805*b*. An input ONE through OR Gate 904 will be transmitted through OR Gate 805*a* and coincident with a pulse from Clock Source 330 will enable AND Gates 801–1*c* to set flip-flop 801–1*a*. If no input is provided through OR Gate 804, corresponding to a ZERO, the set condition of flip-flop 801–0*d* in the previous stage 801–0, representing a stored ONE, will serve to set flip-flop 801–1*a*. Similarly, the reset condition of flip-flop 801–0*d*, representing a stored ZERO, will serve to reset flip-flop 801–1*a* upon the occurrence of a pulse from Clock Source 330 in the absence of a ONE signal through OR Gate 804. Inverter 805*b* is provided in order to prevent a reset condition of flip-flop 801–0*d* from resetting flip-flop 801–1*a* upon receipt of a clock signal in the presence of a ONE signal through OR Gate 804.

Returning now to FIG. 6, it may be noted that with twice the number of paths through the junctor network the number of junctor crosspoints and corresponding controls required is also doubled. Thus, for example, the first output of Pulse Shifter 601*a* in the Send lead of Transmission Channel 104*a* may be connected through Junctor Crosspoint 607 to the first input of Pulse Shifter 601*b* in the Receive lead of the same channel, whereas the second output of Pulse Shifter 601*a* may be connected through Junctor Crosspoint 608 to the second input of Pulse Shifter 601*b* through appropriate operation of the corresponding network circuits. Consequently, the equivalent three stage space division switching network may be represented in the form depicted in FIG. 12. It may be seen therein that the odd numbered intermediate switches (1 . . . 2*n*–1) correspond to the row in the junctor network of FIG. 6 including Crosspoint 607, whereas the even numbered intermediate switches (2 . . . 2*n*) correspond to the row of the junctor network including Crosspoint 608. The time division nonblocking network depicted in FIG. 6 is achieved by the employment of two pulse shifters for each concentrator in the system and a corresponding pair of paths through the junctor crosspoint network between each pair of pulse shifters.

A third embodiment of this invention is depicted in FIG. 9. The arrangement of the pulse shifters and junctor crosspoints in the Network 330 in this instance is similar to that disclosed in the arrangement according to FIG. 6; however, in this instance each pulse shifter has a single input and a single output, a nonblocking network being realized by the provision in the junctor network of twice the number of time slots available in the concentrators. Thus in the input pulse shifters, such as 901 in the Send lead Transmission Channel 104*a*, the number of time slots available at the input is $n$ and at the output 2*n*. Correspondingly the Output Pulse Shifters, such as 904 in the Receive lead of Transmission Channel 104*a*, have $2n$ time slots available at the input and $n$ time slots available at the output.

Figure 10:
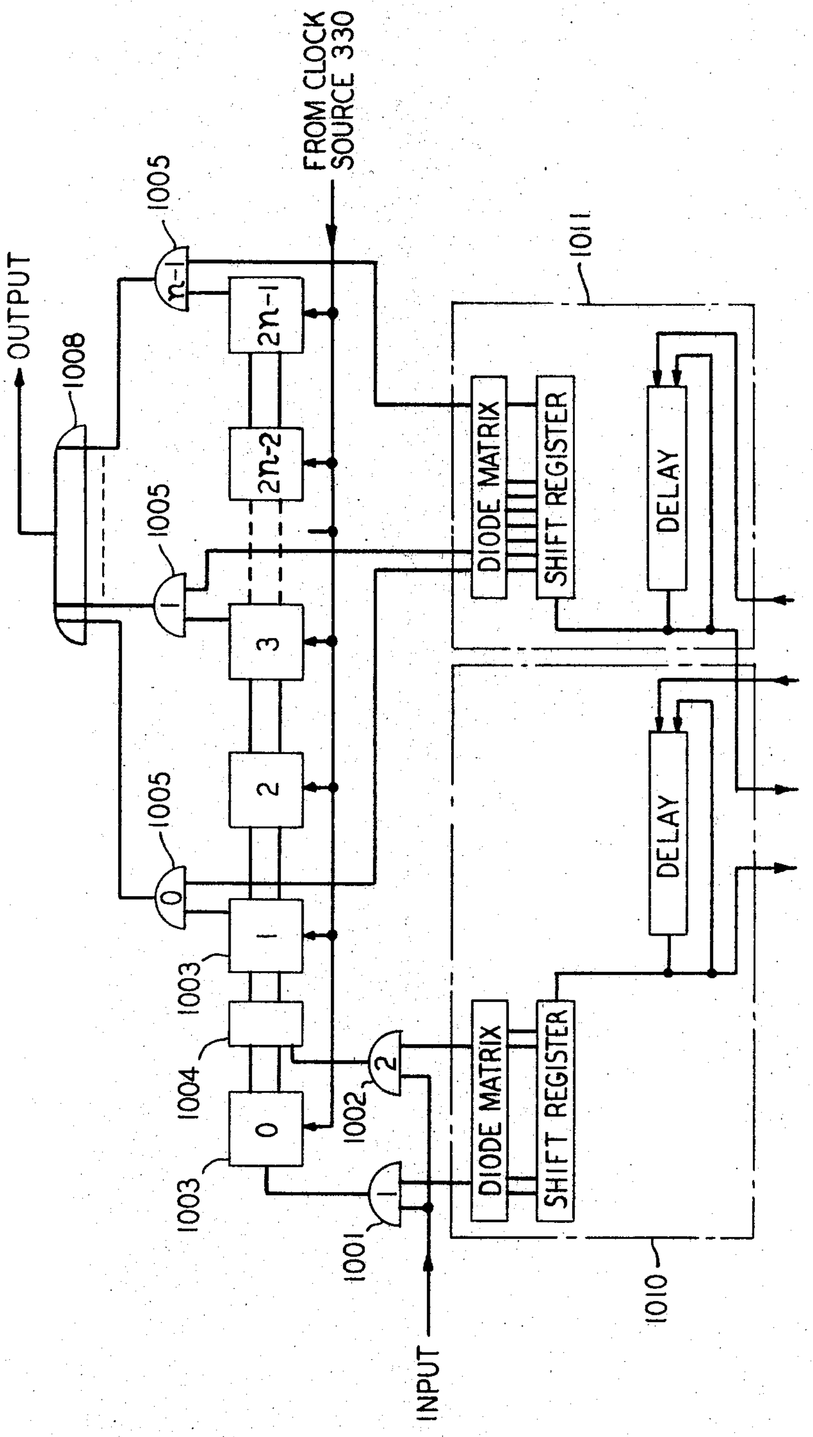
FIG. 10 is a representation in greater detail of specific components depicted in FIG. 9.

The particular pulse shifter arrangement which permits this type of operation is illustrated in FIG. 10. The distinctions from previously described pulse shifters involve input AND Gates 1001 and 1002 connected respectively to stage 0 of the pulse shifter and connecting Network 1004 intermediate stages 0 and 1. The connecting Network 1004 corresponds to that illustrated in FIG. 8B, as previously described. Outputs from the pulse shifter are taken from alternate stages beginning with stage 1 through AND Gates 1005 and OR Gate 1008. The two Pulse Shifter Controls 1010 and 1011 serve the input and output AND gates respectively. Control Circuit 1010 is read out at a frequency which is $n$ times the frequency at which the line gates are sampled. In contrast, Control Circuit 1011 operates with a frequency of twice that for Circuit 1010.

The function of time slot transposition in this pulse shifter is illustrated by the following example. For the Input Pulse Shifter such as 901 the input $(h)$th time slot is transposed to the $(k)$th time slot where $k$ is an even number by activating the Control Circuit 1010 to enable input AND Gate 1002, and after a delay of one time slot in each Register 1003, the Control Circuit 1011 will enable the $$\left|\frac{k}{2}-h\right|$$

modulo $(n)$th Output Gate 1005 in the $(k)$th time slot. Should $k$ be an odd number, the first Input Gate 1001 and the $$\left|\frac{k-1}{2}-h\right|$$

modulo $(n)$th output gates will be enabled. The outputs are transmitted through OR Gate 1008 and supplied to the output lead at double the input frequency, or with a time division repetition rate of $2n$. The Output Pulse Shifters such as 904 must follow a different time slot transposition; thus in moving the $(h')$th time slot at the input of the Pulse Shifter 904 to the $(k')$th time slot at the output, the second Input Gate 1002 and the $$\left|h'-\frac{k'}{2}\right|$$

modulo $(n)$th output gate are enable in the $(h')$th and $(k')$th time slots, respectively, if $k'$ is even. Should $k'$ be odd, the first Input Gate 1001 and the $$\left|h'-\frac{k'-1}{2}\right|$$

modulo $(n)$th output gate are enabled. Of course in this instance the input frequency is twice the output frequency.

Figure 13:
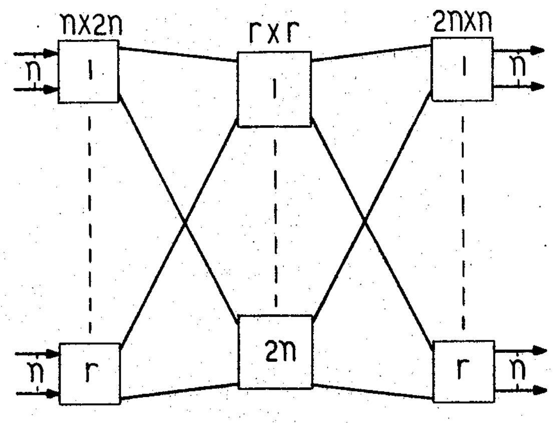
Figure 12:
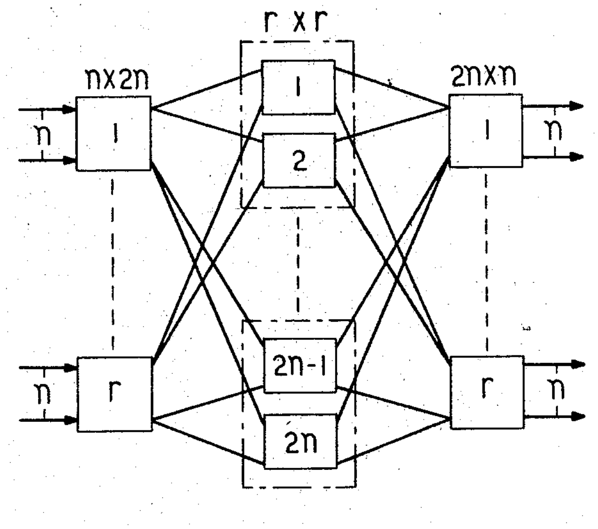

The space division switching network equivalent to the completely nonblocking time division network depicted in FIG. 6 is illustrated in FIG. 13. The $r$ Input Shift Registers such as 901 each have $n$ time slots on the input side and $2n$ time slots on the output side. Similarly, the $r$ Output Pulse Shifters such as 904 each have $2n$ time slots on the input side and $n$ time slots on the output side. Thus the system provides $2n$ time slots in the junctor network. The $r$ Junctor Crosspoints 907 in the row serving Pulse Shifter 901 are each enabled in the desired one of $2n$ time slots to connect a path through to the corresponding Output Pulse Shifter such as 904. The resultant network comprises $rxr$ junctor crosspoints equivalent to the intermediate stage of the space division network of FIG. 13 including $2n$ $rxr$ switches.

It is to be understood that the above-described arrangements are illustrative of the application of the principles of the invention. Numerous other arrangements may be devised by those skilled in the art without departing from the spirit and scope of the invention.

What is claimed is:

1. A communication system comprising a plurality of lines, a plurality of transmission channels each having Send and Receive leads for transmission in opposite directions, a first switching network for connecting active lines to the corresponding transmission channels in distinct time slots of a regularly recurring cycle of time slots to transfer information from said lines to the Send lead and from the Receive lead to said lines, and a junctor network comprising pulse shifting devices, crosspoint switches, means for connecting first ones of said pulse shifting devices between corresponding ones of said Send leads and said crosspoint switches, and means for connecting second ones of said pulse shifting devices between said crosspoint switches and corresponding ones of said Receive leads, each of said pulse shifting devices comprising a single input and a single output and said junctor network comprising control means for establishing a frequency of transmission of information in one direction through said crosspoint switches distinct from the frequency of transmission of information through said first switching network.

2. A time division communication system comprising a plurality of lines arranged in distinct groups, a transmission channel comprising Send and Receive leads for transmission in opposite directions corresponding to each of said distinct groups of lines, means for connecting one line of a communicating pair of said lines to a first channel corresponding to said one line in a first time slot of a recurring cycle and the other line of said communicating pair of lines to a second channel corresponding to said other line in a second time slot of said recurring cycle, and means for interconnecting said first and second channels to complete a connection between said pair of lines comprising a switching network, a first pulse shifting device having an input terminal and a pair of output terminals, a second pulse shifting device having a pair of input terminals and an output terminal, means for connecting the input terminal of said first pulse shifting device to the Send lead in said first channel in said first time slot, means for connecting one of the pair of output terminals of said first pulse shifting device to said switching network in a third time slot, means for connecting one of said input terminals of said second pulse shifting device to said switching network in said third time slot, and means for connecting the output terminal of said second pulse shifting device to the Receive lead in said second channel in said second time slot.

3. A time division communication system comprising a plurality of lines, a transmission channel having a pair of leads for transmission in opposite directions, first switching means for connecting active ones of said lines to said channel in selected time slots of a repetitive cycle to transfer information from said lines to one of said leads and from the other lead to said lines, and second switching means comprising a junctor crosspoint network and delay means for transposing information received from said one lead in one time slot to said other lead in another time slot, said delay means comprising a first delay device connected to receive information from said one lead and a second delay device connected to transmit information to said other lead, and said junctor crosspoint network comprising a plurality of crosspoint switches connected between said first and second delay devices.

4. A time division communication system in accordance with claim 3, wherein said crosspoint switches are included in a pair of paths between said first and second delay devices.

5. A time division communication system in accordance with claim 4, and further comprising control means for operating said crosspoint switches to transmit information between said first and second delay devices via a selected one of said paths.

6. A time division communication system in accordance with claim 3, wherein said first delay device has a single input terminal and a pair of output terminals and said second delay device has a pair of input terminals and a single output terminal.

7. A time division communication system in accordance with claim 6, and further comprising control means for operating said first delay device to transmit information via a selected one of said pair of output terminals and for operating said second delay device to transmit information via the corresponding one of said pair of input terminals.

8. A time division communication system in accordance with claim 7, wherein said first delay device comprises a sequence of delay elements arranged in distinct stages, first gating means connected between each of said stages and said first output terminal and second gating means connected between each of said stages and said second output terminal, and wherein said control means comprises means for selectively enabling said first and second gating means.

9. A communication system in accordance with claim 7, wherein said second delay device comprises a sequence of delay elements arranged in distinct stages, first gating means connected between each of said stages and said first input terminal and second gating means connected between each of said stages and said second input terminal, and wherein said control means comprises means for selectively enabling said first and second gating means.

10. A time division communication system in accordance with claim 9, wherein said second delay device comprises a distinct logic circuit connected between adjacent ones of said stages for applying to a selected stage a signal from either of said input terminals or from the preceding stage and for inhibiting the application of a signal from the preceding stage in the presence of a given input signal.

11. A time division communication system in accordance with claim 3, and further comprising timing means for operating said first delay device to receive information from said one lead at a first frequency and to transmit said information to said junctor crosspoint network at a second frequency and for operating said second delay device to receive information from said junctor crosspoint network at said second frequency and to transmit said information to said other lead at said first frequency.

12. A time division communication system in accordance with claim 3, wherein said delay devices each comprise a plurality of stages with a single input terminal and a single output terminal, a first input gate connected between said input terminal and the first stage of said delay device, a second input gate connected between said input terminal and the second stage of said delay device, and output gates connected between said output terminal and alternate ones of said plurality of stages.

13. A time division communication system in accordance with claim 12, and further comprising control means for transposing information received in the $(h)$th time slot on said one lead to said junctor network in an even numbered $(k)$th time slot and from said junctor network to said other lead in an even numbered $(k')$th time slot, said control means comprising means for enabling in said first delay device the second input gate in the $(h)$th time slot and the $$\left|\frac{k}{2}-h\right|\text{th}$$

output gate in the $(k)$th time slot, and for enabling in said second delay device the second input gate in the $(k)$th time slot and the $$\left|k-\frac{k'}{2}\right|\text{th}$$

output gate in the $(k')$th time slot.

14. A time division communication system in accordance with claim 12, and further comprising control means for transposing information received in the $(h)$th time slot on said one lead to said junctor network in an odd numbered $(k)$th time slot and from said junctor network to said other lead in an odd numbered $(k')$th time slot said control means comprising means for enabling in said first delay device the first input gate in the $(h)$th time slot and the $$\left|\frac{k-1}{2}-h\right|\text{th}$$

output gate in the $(k)$th time slot, and for enabling in said second delay device the first input gate in the $(k)$th time slot and the $$\left|k-\frac{k'-1}{2}\right|\text{th}$$

output gate in the $(k')$th time slot.

15. A communication system comprising a plurality of lines, a plurality of transmission channels each having Send and Receive leads for transmission in opposite directions, a first switching network for connecting active lines to the corresponding transmission channels in distinct time slots of a regularly recurring cycle of time slots to transfer information from said lines to the Send lead and from the Receive lead to said lines, and a junctor network comprising pulse shifting devices, crosspoint switches, means for connecting first ones of said pulse shifting devices between corresponding ones of said Send leads and said crosspoint switches, and means for connecting second ones of said pulse shifting devices between said crosspoint switches and corresponding ones of said Receive leads, each of said first pulse shifting devices comprising a single input and a pair of outputs and each of said second pulse shifting devices comprising a pair of inputs and a single output.

References Cited

UNITED STATES PATENTS 3,281,536 10/1966 Dupieux.

RALPH D. BLAKESLEE, Primary Examiner